US012640421B2

(12) United States Patent
Miyazaki et al.

(10) Patent No.: US 12,640,421 B2
(45) Date of Patent: May 26, 2026

(54) POWER STORAGE DEVICE AND PRODUCING METHOD THEREFOR

(71) Applicant: Prime Planet Energy & Solutions, Inc., Tokyo (JP)

(72) Inventors: Atsushi Miyazaki, Himeji (JP); Shingo Yamane, Nagakute (JP); Kohji Umemura, Ono (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 637 days.

(21) Appl. No.: 18/173,796

(22) Filed: Feb. 24, 2023

(65) Prior Publication Data

US 2023/0318100 A1 Oct. 5, 2023

(30) Foreign Application Priority Data

Mar. 31, 2022 (JP) ................................. 2022-057837

(51) Int. Cl.
| | |
|---|---|
| *H01M 50/15* | (2021.01) |
| *H01M 50/103* | (2021.01) |
| *H01M 50/176* | (2021.01) |
| *H01M 50/636* | (2021.01) |

(52) U.S. Cl.
CPC ......... *H01M 50/15* (2021.01); *H01M 50/103* (2021.01); *H01M 50/176* (2021.01); *H01M 50/636* (2021.01)

(58) Field of Classification Search
CPC ............. H01M 50/636; H01M 50/103; H01M 50/176; H01M 50/15
See application file for complete search history.

(56) References Cited

U.S. PATENT DOCUMENTS

| | | | | |
|---|---|---|---|---|
| 2009/0136843 A1* | 5/2009 | Yamamoto | .......... | H01M 50/197 |
| | | | | 429/185 |
| 2015/0380712 A1* | 12/2015 | Tsunaki | .............. | H01M 50/566 |
| | | | | 429/121 |
| 2016/0329552 A1* | 11/2016 | Tyler | ................... | H01M 50/249 |

FOREIGN PATENT DOCUMENTS

| | | | |
|---|---|---|---|
| JP | 2000156219 | * | 6/2000 |
| JP | 2000156219 A | | 6/2000 |
| JP | 2007103158 | * | 4/2007 |
| JP | 2007103158 A | | 4/2007 |
| JP | 2011076784 | * | 4/2011 |
| JP | 2011076784 A | | 4/2011 |

(Continued)

OTHER PUBLICATIONS

The decision of JPO to grant a Patent for Application 2022057837 (Year: 2024).*

*Primary Examiner* — Alexander Usyatinsky
(74) *Attorney, Agent, or Firm* — HAUPTMAN HAM, LLP

(57) ABSTRACT

A power storage device includes a lid of a case housing an electrode body and a stopper welded to a liquid inlet circumferential portion of the lid by energy-beam welding to seal the liquid inlet. An annular solidified molten portion made of metal, which has been once molten and then solidified, is positioned on a lid thickwise inside than a lid outer plane of the lid over the entire circumference, and has a surface continuing to an outer annular step surface and a peripheral outward surface and coming closer to the lid thickwise inside from a comparative outer surface on an outer side to a comparative inside surface on an inner side when seen from a lid thickwise direction of these two faces.

6 Claims, 6 Drawing Sheets

(56) References Cited

FOREIGN PATENT DOCUMENTS

| | | | |
|----|---------------|---|--------|
| JP | 2013105678 | A | 5/2013 |
| JP | 2021064519 | A | 4/2021 |

* cited by examiner

Figure 6:
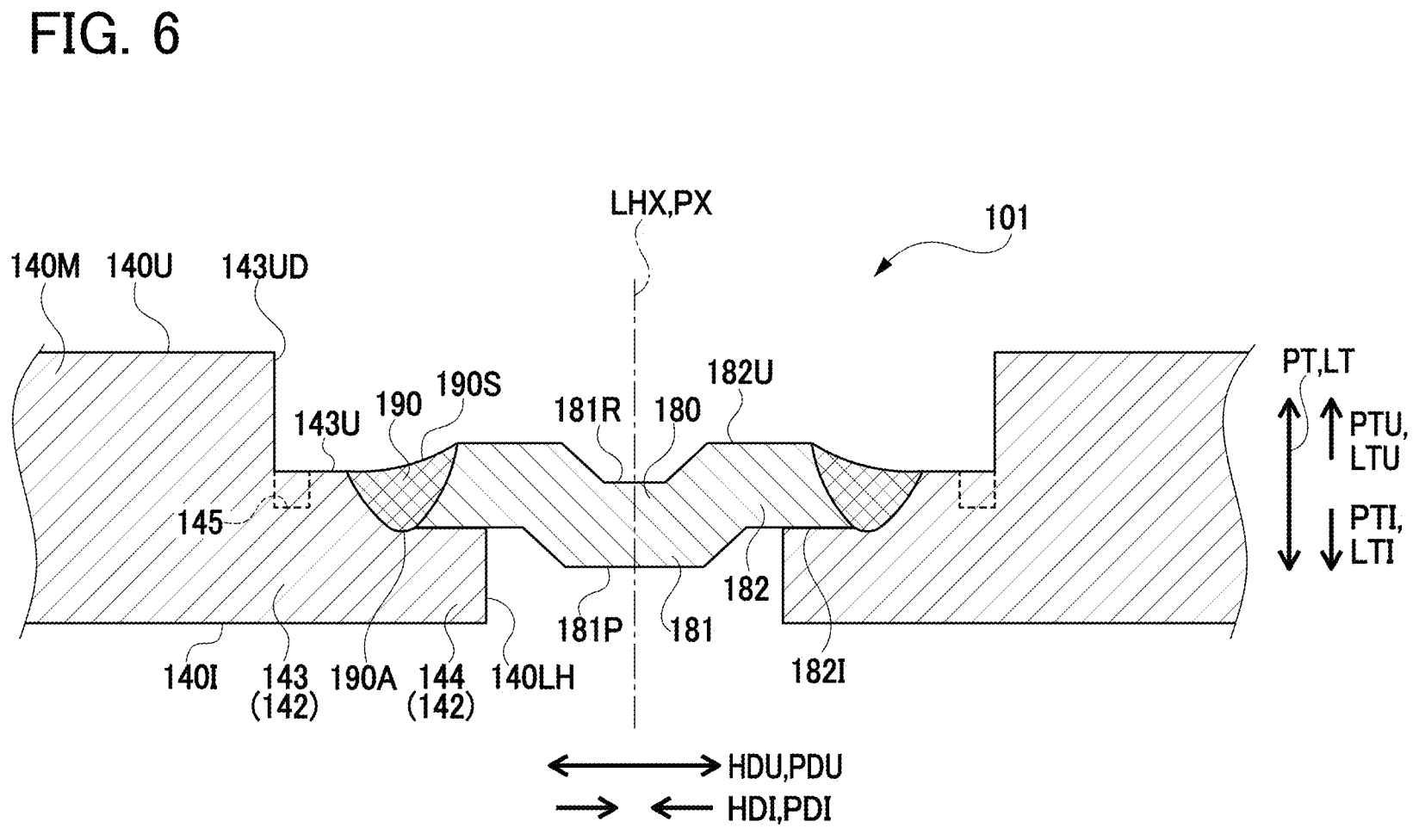

PTU,
LTU

PTI,
LTI

LHX,PX

182U

180

182

181

182I

190S

190

181R

181P

HDU,PDU

HDI,PDI

140LH

143U 144
(142)

190A 140M  140U  143UD

143U

145

143  190
(142)

140I

POWER STORAGE DEVICE AND PRODUCING METHOD THEREFOR

CROSS-REFERENCE TO RELATED APPLICATIONS

This application is based upon and claims the benefit of priority from the prior Japanese Patent Application No. 2022-057837, filed Mar. 31, 2022, the entire contents of which are incorporated herein by reference.

BACKGROUND

Technical Field

The present disclosure relates to a power storage device and a producing method for a power storage device.

Related Art

Heretofore, there has been known a hermetically-sealed power storage device such as a hermetically-sealed battery in which an electrode body and electrolytic solution are housed in a case body sealed its opening with a lid and a positive electrode terminal and a negative electrode terminal penetrate through the lid and extend outside (see JP2013-105678A).

In this type of a power storage device, an electrode body is housed in a case body and an opening is sealed by a lid, and then electrolytic solution is injected in the case through a liquid inlet provided in advance in the lid. Thereafter, this liquid inlet is sealed by laser welding an outer peripheral edge portion of a stopper with a liquid inlet circumferential portion of the lid.

SUMMARY

Technical Problems

However, when the outer peripheral edge portion of the stopper is to be laser-welded with the liquid inlet circumferential portion of the lid, spatters (molten metal droplets) could scatter from welded parts and adhere to various parts of the lid. Especially, adhesion of the spatters on surfaces of a positive electrode insulator and a negative electrode insulator, which are to insulate the lid from a positive electrode terminal and a negative electrode terminal both penetrating and extending outside the lid, is unpreferable since there is a high possibility of degrading the insulation characteristics between a positive electrode or a negative electrode and a casing. Especially in a case that the spatters scatter from the welded parts at a low angle to impinge on and adhere to the insulators by a short flying distance, it is further unpreferable as compared to a case that the spatters scatter with forming a shape of an arch with a relatively long flying distance. Due to such a short flying distance, the spatters (metal droplets) in a molten state impinge on and adhere to the insulators made of resin in a molten state, so that the spatters tend to bite deeply into the insulators and thus to be difficult to fall off.

On the other hand, when a contact step portion formed around a periphery of the liquid inlet of the lid to bring a contact surface of the stopper into contact therewith is recessed and an outer step portion surrounding this contact step portion is provided to dispose the stopper on a radial inside of this outer step portion so that the outer step portion of the lid and the outer peripheral edge portion of the stopper are to be laser welded, there needs to arrange a radial dimension of the outer peripheral edge portion of the stopper smaller than a radial dimension of the outer step portion of the lid. This however results in generation of a clearance between the outer step portion of the lid and the outer peripheral edge portion of the stopper. Furthermore, a size of this clearance cannot be necessarily made uniform in a circumferential direction, so that there might be generated a thin part in a solidified molten portion made of metal formed by laser welding, which has once been molten and then solidified. This could lead to degradation in the sealing performance of the stopper.

The present disclosure has been made in view of the above circumstance and has a purpose of providing a power storage device having preferable insulation characteristics with restraining adhesion of spatters on a positive electrode insulator and a negative electrode insulator and being provided with a stopper welded on a liquid inlet circumferential portion of a lid with preferable sealing characteristics and a producing method of this power storage device.

Means of Solving the Problems (1) One aspect of the present disclosure to solve the above problem is a power storage device comprising: an electrode body; a case body having an opening and housing the electrode body therein; a lid of a flat-plate-like shape sealing the opening and having a liquid inlet penetrating therethrough in a lid thickwise direction; a positive electrode terminal and a negative electrode terminal conducting with the electrode body and penetrating through the lid to extend outside; a positive electrode insulator insulating the lid and the positive electrode terminal; a negative electrode insulator insulating the lid and the negative electrode terminal; and a stopper welded by energy beam to a liquid inlet circumferential portion surrounding the liquid inlet of the lid to seal the liquid inlet, wherein the liquid inlet circumferential portion of the lid includes: a contact step portion of an annular shape including a lid contact surface of an annular shape and surrounding the liquid inlet; and an outer step portion of an annular shape including an outer annular step surface of an annular flat shape and surrounding the contact step portion, the lid contact surface is configured to be positioned on a lid thickwise inside than a lid outer plane of the lid and face toward a lid thickwise outside, the outer annular step surface is configured to be positioned on a hole radial outside than the lid contact surface, on the lid thickwise inside than the lid outer plane and on the lid thickwise outside than the lid contact surface, and face toward the lid thickwise outside, the stopper is configured to: be positioned on a hole radial inside than the outer step portion; include a stopper contact surface of an annular shape facing toward the lid thickwise inside to oppose and be contacted with the lid contact surface, and a peripheral outward surface of a flat shape facing toward the lid thickwise outside, include an outer peripheral edge portion of an annular shape contacted with the contact step portion, a solidified molten portion of an annular shape made of metal, which is once molten and then solidified, is formed between the outer step portion of the lid and the outer peripheral edge portion of the stopper, the solidified molten portion is configured to be positioned its entire circumference on the lid thickwise inside than the lid outer plane of the lid, a surface of the solidified molten portion in its entire circumference is configured to: continue to the outer annular step surface and the peripheral outward surface; and be positioned on the lid thickwise inside as proceeding from a comparative outer surface to a comparative inner surface when the outer annular step surface and the peripheral outward surface are defined as either one of a surface positioned on the lid thickwise outside as the comparative outer surface and a surface positioned on the lid thickwise inside as the comparative inner surface.

In this power storage device, the solidified molten portion is positioned on the lid thickwise inside than the outer plane of the lid. Therefore, even if the spatters are generated when the solidified molten portion is formed by energy beam welding, the spatters flying at a low angle impinge on a step surface between the lid outer plane and an outer step portion of the lid on the lid thickwise outside than the solidified molten portion, so that the spatters are prevented from flying outside the liquid inlet circumferential portion. Accordingly, the spatters in a molten state flying from the solidified molten portion at a low angle can be restrained from adhering by impinging on and deeply biting into the positive electrode insulator and the negative electrode insulator.

On the other hand, in this power storage device, a surface of the solidified molten portion continues to the outer annular step surface of the outer step portion of the lid and the peripheral outward surface of the stopper, and also, the surface is positioned on the lid thickwise inside as proceeding from the comparative outer surface on the lid thickwise outside to the comparative inner surface on the lid thickwise inside of the outer annular step surface and the peripheral outward surface. Specifically, over the entire circumference, there is no locally recessed portion on the surface of the solidified molten portion, and thus a position of the surface of the solidified molten portion in the lid thickwise direction gradually changes from the comparative outer surface to the comparative inner surface to come closer to the lid thickwise inside. Therefore, there is no portion in which the molten metal constituting the solidified molten portion is locally reduced, and thus the solidified molten portion has no local portion that has small dimension in the lid thickwise direction and gets degraded its sealing performance.

Accordingly, the power storage device can achieve preferable insulation characteristics of restraining adhesion of spatters on the positive electrode insulator and the negative electrode insulator and preferable sealing characteristics of welding the stopper to the liquid inlet circumferential portion of the lid.

As the power storage device, a secondary battery such as a lithium-ion secondary battery and a capacitor such as a lithium-ion capacitor may be exemplified.

Further, as energy beam welding, laser welding using laser beam and electron-beam welding using electron beam may be exemplified.

In the liquid inlet circumferential portion of the lid, an inner circumferential surface of the contact step portion may constitute a liquid inlet, and alternatively, a step portion protruding on the hole radial inside may further be provided on the hole radial inside of the contact step portion. Further, the hole radial outside of the outer step portion may continue to the outer plane, and there may be provided an annular groove positioned on the lid thickwise inside than the outer plane of the lid on the hole radial outside of the outer step portion with keeping a clearance from the outer step portion.

(2) Further, in the power storage device according to the above (1), preferably, a shorter one of: a positive electrode shortest distance between the positive electrode insulator and the solidified molten portion; and a negative electrode shortest distance between the negative electrode insulator and the solidified molten portion is equal to or less than 30 mm.

In the above-mentioned power storage device, the shortest distance between the solidified molten portion and the positive electrode insulator or the negative electrode insulator is as short as 30 mm or less. Therefore, the effect of restraining adhesion of the spatters on the positive electrode insulator and the negative electrode insulator by the above configuration is highly expected, and thus, the insulation characteristics of the power storage device can be maintained preferably.

(3) Another aspect of the present disclosure to solve the above problem is A producing method of a power storage device comprising: an electrode body; a case body having an opening and housing the electrode body therein; a lid of a flat-plate-like shape sealing the opening and having a liquid inlet penetrating in a lid thickwise direction; a positive electrode terminal and a negative electrode terminal conducting with the electrode body and penetrating through the lid to extend outside; a positive electrode insulator insulating the lid and the positive electrode terminal; a negative electrode insulator insulating the lid and the negative electrode terminal; and a stopper welded by energy beam to a liquid inlet circumferential portion surrounding the liquid inlet of the lid to seal the liquid inlet, wherein the liquid inlet circumferential portion of the lid includes: a contact step portion of an annular shape including a lid contact surface of an annular shape and surrounding the liquid inlet; and an outer step portion of an annular shape including an outer annular step surface of an annular flat shape and surrounding the contact step portion, the lid contact surface is configured to be positioned on a lid thickwise inside than a lid outer plane of the lid and face toward a lid thickwise outside, the outer annular step surface is configured to be positioned on a hole radial outside than the lid contact surface, on the lid thickwise inside than the lid outer plane and on the lid thickwise outside than the lid contact surface, and face toward the lid thickwise outside, the stopper is configured to: be positioned on a hole radial inside than the outer step portion; include a stopper contact surface of an annular shape facing toward the lid thickwise inside to oppose and be contacted with the lid contact surface, and a peripheral outward surface of a flat shape facing toward the lid thickwise outside, include an outer peripheral edge portion of an annular shape contacted with the contact step portion, a solidified molten portion of an annular shape made of metal, which is once molten and then solidified, is formed between the outer step portion of the lid and the outer peripheral edge portion of the stopper, the solidified molten portion is configured to be positioned its entire circumference on the lid thickwise inside than the lid outer plane of the lid, a surface of the solidified molten portion in its entire circumference is configured to: continue to the outer annular step surface and the peripheral outward surface; and be positioned on the lid thickwise inside as proceeding from a comparative outer surface to a comparative inner surface when the outer annular step surface and the peripheral outward surface are defined as either one of a surface positioned on the lid thickwise outside as the comparative outer surface and a surface positioned on the lid thickwise inside as the comparative inner surface, wherein the outer step portion of the lid before welding includes: an extended outer annular step surface extending from the outer annular step surface toward a hole radial inside; and an inner step surface extending from an inner peripheral edge of the extended outer annular step surface toward the lid thickwise inside to reach the lid contact surface with facing toward the hole radial inside, the outer peripheral edge portion of the stopper before welding includes: an extended peripheral outward surface extending from the peripheral outward surface toward a stopper radial outside; and a stopper outer peripheral end face extending from an outer peripheral edge of the extended peripheral outward surface toward the stopper thickwise inside with facing toward the stopper radial outside, the method includes: stopper disposing to dispose the liquid inlet on the hole radial inside than the outer step portion of the lid in a state in which the stopper contact surface of the stopper opposes and is contacted with the lid contact surface of the lid; and stopper welding to weld the outer step portion of the lid and the outer peripheral edge portion of the stopper over an entire circumference by energy beam, the stopper welding is to perform welding by melting: a part of the outer step portion of the lid before welding on the hole radial inside including the extended outer annular step surface and the inner step surface; and a part of the outer peripheral edge portion of the stopper before welding on the stopper radial outside including the extended peripheral outward surface and the stopper outer-peripheral end face.

In this producing method, the energy beam welding is performed in the stopper welding step such that a part of the outer step portion of the lid before welding and a part of the outer peripheral edge portion of the stopper is respectively welded to form the solidified molten portion between the outer step portion of the lid and the outer peripheral edge portion of the stopper. For this welding, a difference in height is set between the outer step portion of the lid before welding and the outer peripheral edge portion of the stopper in the lid thickwise direction so that a part of molten metal of either one of the outer step portion and the outer peripheral edge portion that is positioned relatively close to the lid thickwise outside as constituting the comparative outer surface is used for filling a clearance between the outer step portion and the outer peripheral edge portion. Accordingly, the solidified molten portion can be formed with no locally recessed portion over the entire circumference and have a surface gradually changed its position in the lid thickwise direction toward the lid thickwise inside from the comparative outer surface to the comparative inner surface. There is no any portion degraded its sealing performance due to local reduction in the molten metal constituting the solidified molten portion to locally reduce a dimension of the solidified molten portion in the lid thickwise direction.

Furthermore, the spatters flying from a portion to be the solidified molten portion at a low angle impinge on a step surface or the like between the lid outer plane and the outer step portion of the lid which are located on the lid thickwise outside than the solidified molten portion, so that the spatters can be prevented from flying out of the liquid inlet circumferential portion. Accordingly, the spatters flying from the solidified molten portion at a low angle in the molten state can also be restrained from adhering by impinging and deeply biting into the positive electrode insulator and the negative electrode insulator.

As mentioned above, the power storage device can achieve preferable insulation characteristics by restraining adhesion of the spatters to the positive electrode insulator and the negative electrode insulator and achieve preferable sealing characteristics of welding the stopper to the liquid inlet circumferential portion of the lid.

(4) Further in the producing method of the power storage device according to the above (3), preferably, a height from the stopper contact surface of the lid before welding to the extended outer annular step surface is as 1.1 to 1.4 times long as a thickness from the stopper contact surface of the stopper before welding to the extended peripheral outward surface.

In the stopper welding (welding of the stopper), it is preferable that the outer step portion of the lid and the outer peripheral edge portion of the stopper are molten by the energy beam so that a leading end of the formed solidified molten portion (an inner end on the lid thickwise inside) is positioned at the almost same level with the lid contact surface. While too shallow molten level leads to low welding strength, too deep molten level leads to melting of the lid over the whole lid thickwise direction, both of which are unpreferable.

On the other hand, there is the case that the height from the lid contact surface to the extended outer annular step surface of the lid, which is hereinafter referred as the height $H1$, is too large as compared to the thickness of the outer peripheral edge portion of the stopper, i.e., the thickness from the stopper contact surface to the extended peripheral outward surface, which is hereinafter referred as the thickness $T1$. In other words, there is a case that a difference in level of height between the height $H1$ and the thickness $T1$ is large. In this case, a difference could be easily generated in the molten state of the outer step portion of the lid and the outer peripheral edge portion of the stopper when the energy beam is irradiated on the outer step portion and the outer peripheral edge portion. Specifically, a vicinity of the stopper outer-peripheral end face on the stopper radial outside of the outer peripheral edge portion of the stopper is molten over the whole stopper thickwise direction. However, of the portion on the hole radial inside of the outer step portion of the lid, a portion on the lid thickwise inside fails to be molten deeply enough, resulting in distortion in a shape of the solidified molten portion, so that the welding between the outer step portion of the liquid inlet circumferential portion of the lid and the outer peripheral edge portion of the stopper could be made incompletely.

When the height $H1$ is not very large as compared to the thickness $T1$, an amount of the molten metal formed by melting the outer step portion of the lid becomes less, so that a filling amount of the molten metal to be filled in a clearance between the outer step portion of the lid and the outer peripheral edge portion of the stopper might fall short.

To address this, as mentioned above, the height $H1$ from the lid contact surface to the extended outer annular step surface is made as 1.1 to 1.4 times large as the thickness $T1$ from the stopper contact surface of the stopper to the extended peripheral outward surface. Thus, by melting the portion on the hole radial inside of the outer step portion of the liquid inlet circumferential portion of the lid, the molten metal (molten metal body) to be the solidified molten portion is obtained, so that there can be provided the solidified molten portion in a preferable figure between the outer step portion of the liquid inlet circumferential portion of the lid and the outer peripheral edge portion of the stopper to weld both the outer step portion and the outer peripheral edge portion.

(5) The producing method of the power storage device according to the above (3), preferably, a thickness from the stopper contact surface of the liquid inlet before welding to the extended peripheral outward surface is as 1.1 to 1.4 times long as a height from the lid contact surface of the lid before welding to the extended outer annular step surface.

As mentioned above, in the stopper welding (welding of the stopper), it is preferable to melt the outer step portion of the lid and the outer peripheral edge portion of the stopper by the energy beam so that the leading end of the solidified molten portion formed by melting is positioned at the almost same level with the lid contact surface.

On the other hand, there is a case that the thickness of the outer peripheral edge portion of the stopper, namely, the thickness from the stopper contact surface to the extended peripheral outward surface, which is hereinafter referred as the thickness T2, is too large as compared to the height from the lid-side contract surface to the extended outer annular step surface of the lid, which is hereinafter referred as the height H2. In other words, there is a case that a difference in level of height between the thickness T2 and the height H2 is large. In this case, irradiation of the energy beam to the outer step portion and the outer peripheral edge portion easily causes a difference in the molten state of the outer step portion of the lid and the outer peripheral edge portion of the stopper. To be specific, a portion on the hole radial inside of the outer step portion of the liquid inlet circumferential portion of the lid gets deeply molten, but a vicinity of the stopper outer-peripheral end face on the stopper radial outside of the outer peripheral edge portion of the stopper fails to be molten deeply enough to a portion on the stopper thickwise inside. This causes distortion in a shape of the solidified molten portion, resulting in incomplete welding of the outer step portion of the liquid inlet circumferential portion of the lid and the outer peripheral edge portion of the stopper.

On the other hand, when the thickness T2 is not very large as compared to the height H2, an amount of the molten metal formed by melting the outer peripheral edge portion of the stopper becomes less, and thus a filling amount of the molten metal to be filled in the clearance between the outer step portion of the lid and the outer peripheral edge portion of the stopper could fall short.

To address this, as mentioned above, the thickness from the stopper contact surface to the extended peripheral outward surface of the stopper is made to be as 1.1 to 1.4 times long as the height from the lid contact surface to the extended outer annular step surface. Accordingly, melting the vicinity of the stopper outer-peripheral end face on the stopper radial outside of the outer peripheral edge portion of the stopper achieves preferable formation of the solidified molten portion between the outer step portion of the stopper circumferential portion of the lid and the outer peripheral edge portion of the stopper with obtaining the molten metal (molten metal body) which is to become the solidified molten portion for welding the outer step portion and the outer peripheral edge portion.

BRIEF DESCRIPTION OF THE DRAWINGS

FIG. 3 is a partial enlarged sectional view showing a state in which a stopper is placed on a lid of the battery in the embodiment 1 and the modified embodiment 1;

FIG. 4 is a partial enlarged sectional view showing a state in which the stopper placed on the lid of the battery is laser welded in the embodiment 1 and the modified embodiment 1;

FIG. 5 is a partial enlarged sectional view showing a state in which the stopper is placed on the lid of the battery in the embodiment 2 and the modified embodiment 2; and FIG. 6 is a partial enlarged sectional view showing a state in which the stopper placed on the lid of the battery is laser welded in the embodiment 2 and the modified embodiment 2.

DETAILED DESCRIPTION OF THE EXEMPLARY EMBODIMENTS

Figure 1:
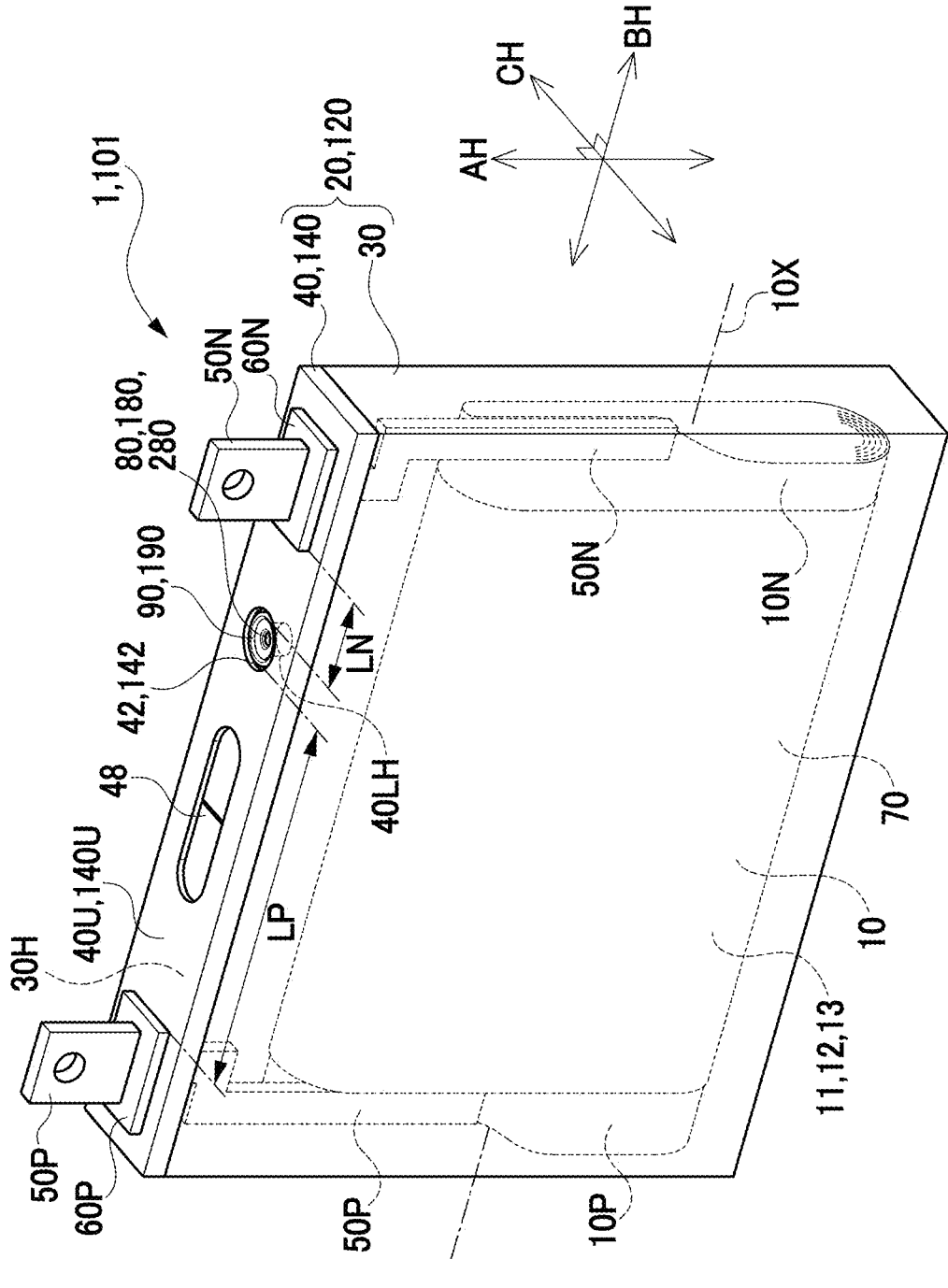
FIG. 1 is a perspective view of a battery in embodiments 1 and 2 and modified embodiments 1 and 2.
Figure 2:
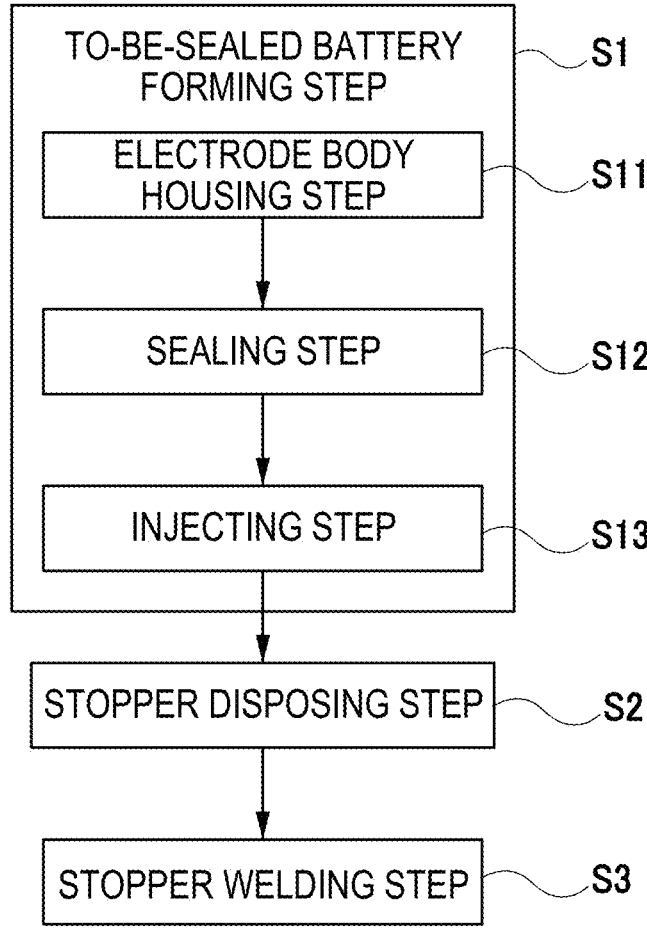
FIG. 2 is a flowchart indicating each step for producing the battery in the embodiments 1 and 2 and the modified embodiments 1 and 2.
Figure 3:
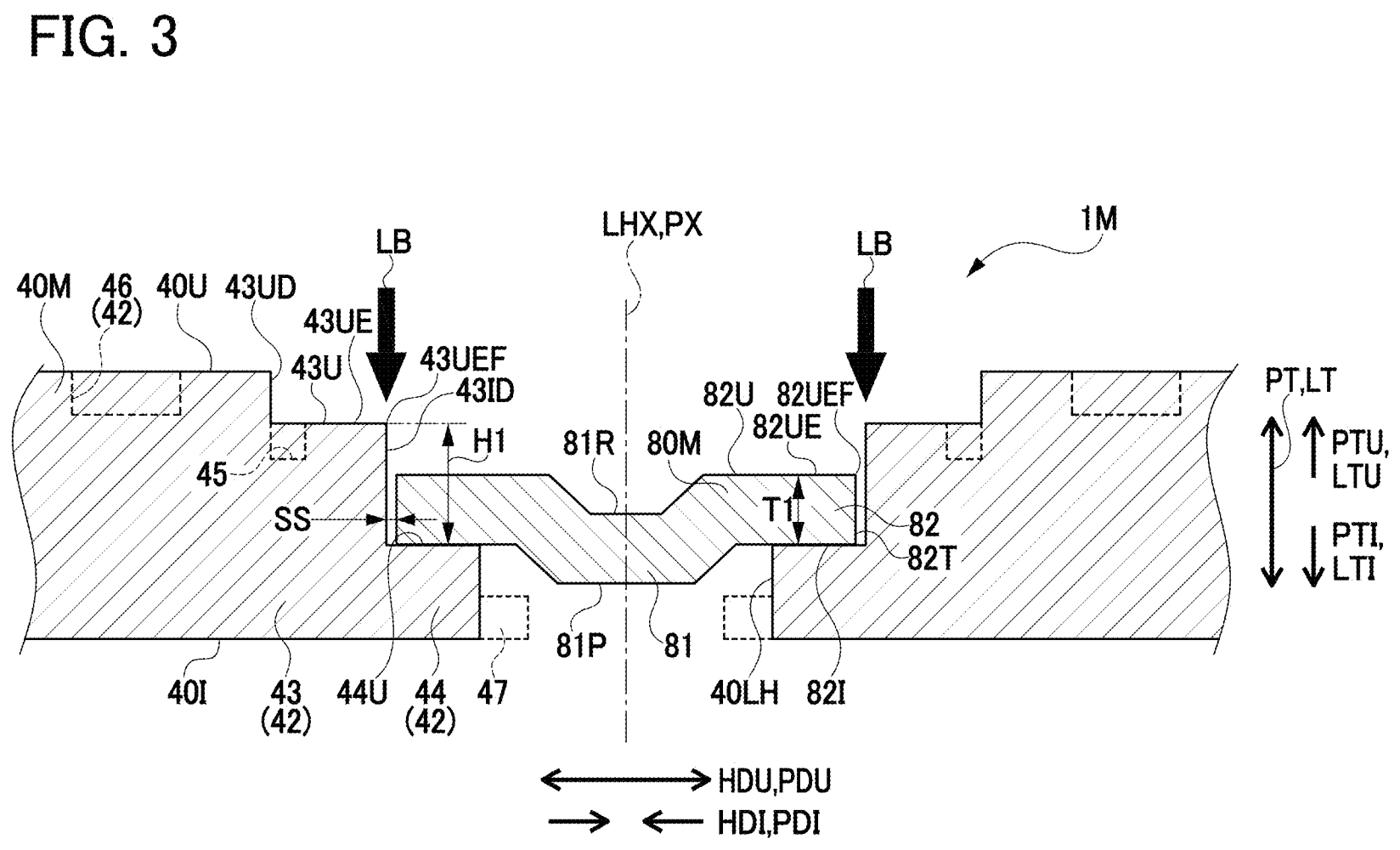
Figure 4:
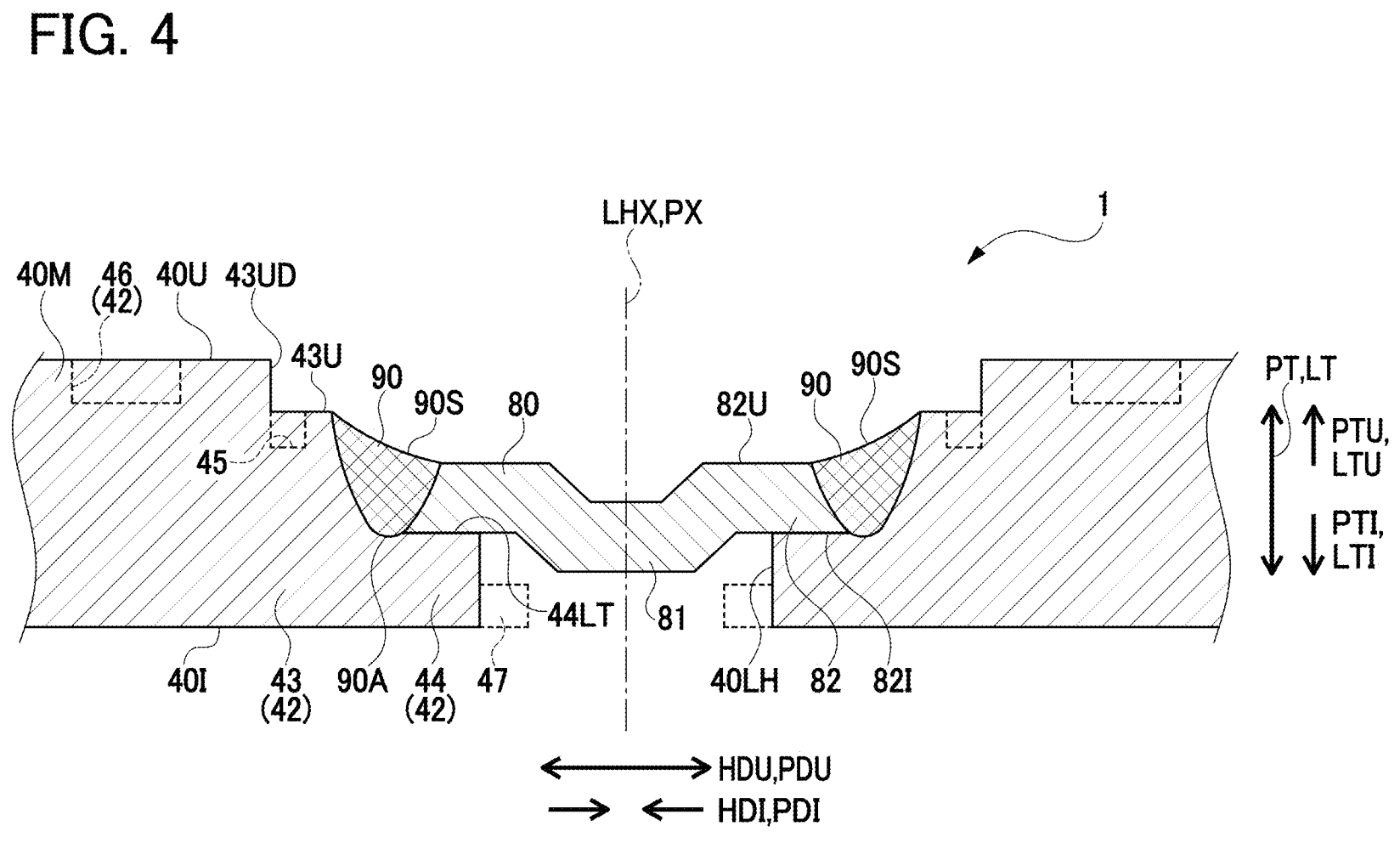

An embodiment of the present disclosure is explained below with reference to the accompanying drawings. FIG. 1 is a perspective view of a battery (power storage device) 1 according to the present embodiment 1 and others. FIG. 2 is a flowchart illustrating each step. FIG. 3 and FIG. 4 show an enlarged sectional view and an explanatory view illustrating a relation of a lid member 40 and a stopper 80 of the battery 1. Herein, the following explanation is to be made with defining a battery height direction AH, a battery widthwise direction BH, and a battery thickwise direction CH of the battery 1 as directions indicated in FIG. 1. This battery 1 is a rectangular hermetically-closed lithium-ion secondary battery mounted on vehicles such as a hybrid car, a plug-in hybrid car, and an electric automobile.

Embodiment 1

The battery 1 is configured with a case 20, an electrode body 10 housed inside the case 20, a positive electrode terminal 50P and a negative electrode terminal 50N fixedly provided in the case 20, and others. The electrode body 10 is covered with a not-shown bag-shaped insulation film inside the case 20. Further in the case 20, electrolytic solution 70 is housed in a state that a part of the solution is impregnated in the electrode body 10 and another part remains on a bottom part of the case 20.

The case 20 of those components is made of metal (aluminum in the present embodiment) and is configured with a case body 30 of a bottomed rectangular cylindrical shape having an opening 30H in one end (an upper side in FIG. 1) and a lid 40 of a rectangular plate-like shape welded to the case body 30 to close the opening 30H.

The lid 40 is fixedly provided with a positive electrode terminal 50P made of aluminum material, penetrating the lid 40 and extending outside the case 20 in a vicinity of one end portion (an upper left side in FIG. 1) in the battery width direction BH in a state insulated from the lid 40 through a positive electrode insulator 60P. This positive electrode terminal 50P is connected and continues to a positive current collecting portion 10P of the electrode body 10 in the case 20.

Further, the lid 40 is fixedly provided with a negative electrode terminal 50N made of copper material, penetrating through the lid 40 and extending outside the case 20 in a vicinity of the other end portion (a lower right side in FIG. 1) in the battery width direction BH in a state insulated from the lid 40 through a negative electrode insulator 60N. This negative electrode terminal 50N is connected and continues to a negative current collecting portion 10N of the electrode body 10 in the case 20.

Herein, the positive electrode insulator 60P and the negative electrode insulator 60N are made of insulative resin, and in the present embodiment, specifically made of PFA. As insulative resin material configuring the insulators 60P and 60N, any appropriate insulative resin such as PE, PP, and PPS may be used other than fluororesin such as the above-mentioned PFA.

Further, in a vicinity of a center portion of the lid 40 in the battery width direction BH, a safety valve 48 to be broken and open when an inner pressure of the case 20 exceeds a valve-open pressure. In a center portion of a liquid inlet circumferential portion 42 of the lid 40 close to the negative electrode terminal 50N (a right side in FIG. 1), a liquid inlet 40LH (see FIG. 3 and FIG. 4) communicating inside and outside of the case 20 is perforated. This liquid inlet 40LH is used for injecting the electrolytic solution 70 in the case 20.

This liquid inlet 40LH is hermetically closed by a disc-like stopper 80 made of metal (in the present embodiment, aluminum). Specifically, the liquid inlet 40LH is covered with the stopper 80 that is placed in the liquid inlet circumferential portion 42 of the lid 40, and then closed by welding the stopper 80 to the liquid inlet circumferential portion 42 of the lid 40 over the entire circumference. In between the lid 40 and the stopper 80, there is provided an annular-shaped solidified molten portion 90 formed by metal which has once been molten and then solidified. As shown in FIG. 4, this annular solidified molten portion 90 is positioned on a lid thickwise inside LTI (a lower side in FIG. 4) than a lid outer plane 40U of the lid 40 over the entire circumference as shown in FIG. 4. Therefore, among the spatters (not shown) generated when the solidified molten portion 90 is to be formed for welding by laser welding, the molten spatters flying at a low angle impinge on the outer step surface 43UD and the like, so that the spatters are prevented from impinging on the positive electrode insulator 60P and the negative electrode insulator 60N to deeply get into and adheres to the insulators.

Furthermore, the solidified molten portion 90 has a surface 90S which continues to the outer annular step surface 43U of the outer step portion 43 of the lid 40 and to the peripheral outward surface 82U of the stopper 80. The surface 90S is positioned on the lid thickwise inside LTI as the surface 90S proceeds from the outer annular step surface 43U (in the present example, one example of a comparative outer surface) positioned on a lid thickwise outside LTU (an upper side in FIG. 4) to the peripheral outward surface 82U (in the present example, one example of a comparative inner surface) positioned on the lid thickwise inside LTI of the outer annular step surface 43U and the peripheral outward surface 82U. In other words, over the entire circumference, the surface 90S of the solidified molten portion 90 has no local recessed portions, and a position in the lid thickwise direction LT of the surface 90S of the solidified molten portion 90 gradually changes toward the lid thickwise inside LTI from the outer annular step surface 43U to the peripheral outward surface 82U. Therefore, in this battery 1, there is no portion degraded its sealing performance due to local reduction in the molten metal constituting the solidified molten portion 90 which causes local reduction in a dimension of the solidified molten portion 90 in the lid thickwise direction LT.

As mentioned above, the battery 1 achieves preferable insulation characteristics with restraining adhesion of the spatters to the positive electrode insulator 60P and the negative electrode insulator 60N and preferable sealing characteristics of welding the stopper 80 to the liquid inlet circumferential portion 42 of the lid 40.

As mentioned above, in the battery 1 of the present embodiment 1, the liquid inlet 40LH and the stopper 80 are provided in a portion of the lid 40 closer to the negative electrode terminal 50N than a center in the battery width direction BH (a lower right side in FIG. 1). Accordingly, as understood easily from FIG. 1, a negative electrode shortest distance LN as the shortest distance between the annular solidified molten portion 90 formed by welding the stopper

80 and the negative electrode insulator 60N is made smaller than a positive electrode shortest distance LP as the shortest distance between the solidified molten portion 90 and the positive electrode insulator 60P. In the battery 1 (the case 20) of the present embodiment 1, as the shorter one of the positive electrode shortest distance LP and the negative electrode shortest distance LN, the negative electrode shortest distance LN is set as about 25 mm which is shorter than 30 mm. When a distance from the solidified molten portion 90 to the insulators 60P and 60N is thus short, a flying distance of the spatters scattering from the solidified molten portion 90 is short, so that the spatters in the molten state are easy to adhere to the insulators 60P and 60N by impinging and deeply biting into the insulators. However, in the present embodiment, the solidified molten portion 90 is positioned over the entire circumference on the lid thickwise inside LTI (a lower side in FIG. 4) than the lid outer plane 40U of the lid 40. Accordingly, it is effectively prevented that the molten spatters flying at a low angle impinge on the negative electrode insulator 60N having the short negative electrode shortest distance LN, thereby maintaining the preferable insulation characteristics.

Further, the electrode body 10 housed in the case 20 is a so-called flat-wound electrode body formed by winding a strip-shaped positive electrode plate 11 and a strip-shaped negative electrode plate 12 interposed with a pair of strip-shaped separators 13 and pressing them in the battery thickwise direction CH to be flattened. This electrode body 10 is placed sideways, namely, in a posture to arrange a winding axis 10X to coincide with the battery widthwise direction BH and housed in the case 20. A positive current collecting portion 10P conducting with the positive electrode plate 11 in the electrode body 10 is connected to the positive electrode terminal 50P, and as mentioned above, this positive electrode terminal 50P penetrates the lid 40 and extends outside. Further, a negative current collecting portion 10N conducting with the negative electrode plate 12 in the electrode body 10 is connected to the negative electrode terminal 50N, and this negative electrode terminal 50N penetrates the lid 40 and extends outside.

Next, a producing method of this battery 1 is explained with reference to a flowchart in FIG. 2 and enlarged sectional views of FIG. 3 and FIG. 4.

Firstly, in a to-be-sealed battery forming step S1, the flat-wound electrode body 10 has been formed in advance by a known method. Further, by use of a method such as ultrasonic welding, the positive current collecting portion 10P and the negative current collecting portion 10N of the electrode body 10 are each connected to each inner end portion of the positive electrode terminal 50P and the negative electrode terminal 50N which are fixedly provided in a to-be-sealed lid 40M so that the to-be-sealed lid 40M and the electrode body 10 are integrated by the positive electrode terminal 50P and the negative electrode terminal 50N. Furthermore, the electrode body is covered with a resin film (not shown) which has been folded into a box-like shape.

Subsequently, in an electrode body housing step S11 in the to-be-sealed battery forming step S1, the electrode body 10 integrated with the to-be-sealed lid 40M is housed in the case body 30 through the opening 30H, and the opening 30H of the case body 30 is closed by the to-be-sealed lid 40M.

Subsequently, in a sealing step S12, by use of a method such as laser welding, the case body 30 and the to-be-sealed lid 40M are welded over an entire circumference of the to-be-sealed lid 40M to form the case 20.

In a subsequent injecting step S13, electrolytic solution 70 of a predetermined amount is injected in the case 20 through the liquid inlet 40LH of the to-be-sealed lid 40M. Thus, the electrolytic solution 70 is impregnated in the electrode body 10. Thus, a to-be-sealed battery 1M in which inside and outside of the case 20 are communicated through the liquid inlet 40LH is formed. Herein, prior to performing the following stopper disposing step S2 and a stopper welding step S3, this to-be-sealed battery 1M may be applied with processing such as initial charging and aging and applied with various tests.

In the stopper disposing step S2, as shown in FIG. 3, of the to-be-sealed lid 40M of the to-be-sealed battery 1M, a to-be-sealed stopper 80M is placed on the liquid inlet circumferential portion 42 to cover the liquid inlet 40LH by the to-be-sealed stopper 80M.

In the following stopper welding step S3, the liquid inlet circumferential portion 42 of the to-be-sealed lid 40M and an outer peripheral edge portion 82 of the to-be-sealed stopper 80M are laser welded over the entire circumference by laser beam LB. Thus, the to-be-sealed lid 40M and the to-be-sealed stopper 80M constitute the lid 40 to which the stopper 80 is welded. In between the liquid inlet circumferential portion 42 of this lid 40 and the outer peripheral edge portion 82 of the stopper 80, the solidified molten portion 90 formed by metal of those elements which have once got molten and then solidified is formed annularly, and thus the battery 1 in which the electrode body 10 is hermetically sealed in the case 20 is completed (see FIG. 4).

The completed hermetically-sealed battery 1 may be applied with various processes and tests prior to the following shipping.

Next, the to-be-sealed lid 40M and the to-be-sealed stopper 80M of the present embodiment used in the stopper arranging step S2 is explained (see FIG. 3).

Herein, in the to-be-sealed lid 40M and the lid 40, the lid thickwise direction LT, the lid thickwise outside LTU, and the lid thickwise inside LTI are indicated with arrows in FIG. 3. The lid thickwise direction LT coincides with the battery height direction AH in the battery 1. Further, a hole radial outside HDU and a hole radial inside HDI centered about a hole axis LHX of the liquid inlet 40LH are also indicated with arrows in FIG. 3. In the battery 1, the lid thickwise direction LT coincides with the battery height direction AH. These directions are similarly arranged in FIG. 4 to FIG. 6, too.

Furthermore, in the to-be-sealed stopper 80M and the stopper 80, the stopper thickwise direction PT, the stopper thickwise outside PTU, and the stopper thickwise inside PTI are also indicated with arrows in FIG. 3. In a state in which the to-be-sealed stopper 80M is placed on the liquid inlet circumferential portion 42 of the to-be-sealed lid 40M, these directions coincide with the lid thickwise direction LT, the lid thickwise outside LTU, and the lid thickwise inside LTI, respectively, as shown in FIG. 3. A stopper radial outside PDU and a stopper radial inside PDI centered about a stopper axis PX of the to-be-sealed stopper 80M and the stopper 80 are also indicated with arrows in FIG. 3. In a state in which the to-be-sealed stopper 80M is placed on the liquid inlet circumferential portion 42 of the to-be-sealed lid 40M such that the stopper axis PX coincides with the hole axis LHX, these directions coincide with the hole radial outside HDU and the hole radial inside HDI centered about the hole axis LHX as shown in FIG. 3. However, if the to-be-sealed stopper 80M is misplaced from the liquid inlet circumferential portion 42 of the to-be-sealed lid 40M, the stopper axis PX may not coincide with the hole axis LHX. These directions are also similarly arranged in FIG. 4 to FIG. 6.

The to-be-sealed lid 40M is of a rectangular flat-plate-like shape formed of a flat lid outer plane 40U facing toward the lid thickwise outside LTU (an upper side in FIG. 3) and a flat lid inner plane 40I facing toward the lid thickwise inside LTI (a lower side in FIG. 3). The liquid inlet circumferential portion 42 of this to-be-sealed lid 40M includes a contact step portion 44 of an annular shape surrounding the liquid inlet 40LH and an outer step portion 43 of an annular shape surrounding this contact step portion 44.

To be more specific, the contact step portion 44 includes an annular flat lid contact surface 44 surrounding the liquid inlet 40LH of a circular shape, which penetrates through the to-be-sealed lid 40M in the lid thickwise direction LT and being placed on the lid thickwise inside LTI than the lid outer plane 40U to face toward the lid thickwise outside LTU.

On the other hand, the outer step portion 43 includes a flat-annular shaped outer annular step surface 43U annularly surrounding the contact step portion 44 and being placed on the lid thickwise inside LTI than the lid outer plane 40U and on the lid thickwise outside LTU and on the hole radial outside HDU than the lid contact surface 44U to face toward the lid thickwise outside LTU. The outer step portion 43 also includes an extended outer annular step surface 43UE extending to the hole radial inside HDI from the outer annular step surface 43U. In addition, the outer step portion 43 includes an inner step surface 43ID extending from an inner peripheral edge 43UEF of the extended outer annular step surface 43UE to the lid thickwise inside LTI to reach the lid contact surface 44U with facing toward the hole radial inside HDI.

On the other hand, the to-be-sealed stopper 80M includes a center portion 81 recessed toward the stopper thickwise inside PTI (a lower side in FIG. 3) to be of a conical frustum shape and the outer peripheral edge portion 82 of a flat annular shape surrounding this center portion 81. The center portion 81 includes a center recessed surface 81R depressed to be of the conical frustum shape with facing toward the stopper thickwise outside PTU and a center protruding surface 81P protruding toward the stopper thickwise inside PTI to be of the conical frustum shape. Further, the outer peripheral edge portion 82 includes a stopper contact surface 82I of a flat annular shape facing toward the lid thickwise inside LTI, a peripheral outward surface 82U of a flat annular shape facing toward the stopper thickwise outside PTU, and an extended peripheral outward surface 82UE extended from this peripheral outward surface 82U toward the stopper radial outside PDU. Further, of this extended peripheral outward surface 82UE, a cylindrical stopper outer-peripheral end face 82T extending toward the stopper thickwise inside PTI from the outer peripheral edge 82UEF on the stopper radial outside PDU is formed to reach the stopper contact surface 82I to face toward the stopper radial outside PDU.

In the stopper disposing step S2, the to-be-sealed stopper 80M is disposed on the liquid inlet circumferential portion 42 of the to-be-sealed lid 40M of the to-be-sealed battery 1M to cover the liquid inlet 40LH by this to-be-sealed stopper 80M. Specifically, the to-be-sealed stopper 80M separately prepared is placed on the hole radial inside HDI of the outer step portion 43 of the liquid inlet circumferential portion 42 of the to-be-sealed lid 40M. In this stopper disposing step S2, the stopper contact surface 82I of the outer peripheral edge portion 82 of the to-be-sealed stopper 80M opposes the lid contact surface 44U of the contact step portion 44 of the to-be-sealed lid 40M to be contacted therewith. Thus, the annular outer peripheral edge portion 82 of the to-be-sealed stopper 80M comes to contact with the contact step portion 44 of the to-be-sealed lid 40M. As shown in FIG. 3, in this state, a height H1 from the lid contact surface 44U of the to-be-sealed lid 40M to the extended outer annular step surface 43UE is made larger than a thickness T1 from the stopper contact surface 82I to the extended peripheral outward surface 82UE of the to-be-sealed stopper 80M. Namely, there is provided a difference in height in the lid thickwise direction LT between the outer step portion 43 of the to-be-sealed lid 40M and the outer peripheral edge portion 82 of the to-be-sealed stopper 80M.

In the following stopper welding step S3, laser beam LB is irradiated to the outer step portion 43 of the to-be-molten lid 40M to melt a part including the extended outer annular step surface 43UE and the inner step surface 43ID on the hole radial inside HDI. Along with this, a part including the extended peripheral outward surface 82UE and the stopper outer peripheral end face 82T on the stopper radial outside PDU of the outer peripheral edge portion 82 of the to-be-sealed stopper 80M is molten. Thus, the outer peripheral edge portion 82 of the stopper 80 is laser welded to the outer step portion 43 of the lid 40 over the entire circumference (see FIG. 4). A filler material is not used for this laser welding, and the formed solidified molten portion 90 is made only of metal (aluminum) constituting the lid 40 and the stopper 80.

In the present embodiment 1, as mentioned above, there is created a difference in height in the lid thickwise direction LT between the outer step portion 43 of the to-be-sealed lid 40M and the outer peripheral edge portion 82 of the to-be-sealed stopper 80M. The laser welding of the stopper welding step S3 is performed for welding the outer step portion 43 and the outer peripheral edge portion 82 by melting. Accordingly, a portion relatively outside on the lid thickwise outside LTU, namely a part of molten metal of the outer step portion 43 of the to-be-sealed lid 40M on the hole radial inside HDI can be used for filling a clearance SS between the outer step portion 43 of the to-be-sealed lid 40M and the outer peripheral edge portion 82 of the to-be-sealed stopper 80M for formation of the solidified molten portion 90. In this manner, the solidified molten portion 90 can be easily formed over the entire circumference with the surface 90S which continues to the outer annular step surface 43U and the peripheral outward surface 82U and is positioned on the lid thickwise inside LTI as proceeding from the outer annular step surface 43U (one example of the comparative outer face) to the peripheral outward surface 82U (one example of the comparative inner face). Therefore, this battery 1 has no portion that has locally less molten metal constituting the solidified molten portion 90, which could result in local reduction in a dimension of the solidified molten portion 90 in the lid thickwise direction LT (in a upper and lower direction in FIG. 4), causing degradation in the sealing performance of that portion.

Further, the solidified molten portion 90 of the battery 1 (the lid 40 after sealing) is positioned on the lid thickwise inside LTI (a lower side in FIG. 4) than the lid outer plane 40U of the lid 40 over its entire circumference. In the present embodiment 1, the solidified molten portion 90 is positioned on the lid thickwise inside LTI by about 0.2 mm than the lid outer plane 40U over its entire circumference. Therefore, in laser welding, the molten spatters flying at a low angle from the solidified molten portion 90 impinge on the outer step surface 43UD between the lid outer plane 40U and the outer step portion 43, so that the spatters are restrained from adhering by impinging on and deeply biting into the positive electrode insulator 60P and the negative electrode insulator 60N.

In addition, in the present embodiment 1, as mentioned above, the height H1 from the lid contact face 44U to the extended outer annular step surface 43UE of the to-be-sealed lid 40M (in the present embodiment, the height H1=0.5 mm) is made larger than the thickness T1 from the stopper contact surface 82I to the extended peripheral outward surface 82UE of the to-be-sealed stopper 80M (in the present embodiment, the thickness T=0.4 mm). This height H1 is better to be set as 1.1 to 1.4 times long as the thickness T1 (H1=1.1× T1 to 1.4× T1), and in the present embodiment H1 is set as 1.25 times (H1=1.25× T1).

In the stopper welding step S3, as shown in FIG. 4, melting is preferably made such that a leading end (an inner end on the lid thickwise inside LTI) 90 A of the formed solidified molten portion 90 is positioned at the almost same level with the lid contact surface 44U in the lid thickwise direction LT. If the position of the leading end 90A is too shallow, the welding strength is lowered and if the position is too deep, the entire lid 40 could be molten in the lid thickwise direction LT, both of which are not preferable.

When the height H1 is too large as compared to the thickness T1, irradiation of the laser beam LB to the outer step portion 43 and the outer peripheral edge portion 82 from the lid thickwise outside easily generates a difference in the molten state between the outer step portion 43 of the lid 40 and the outer peripheral edge portion 82 of the stopper 80. Specifically, a vicinity of the stopper outer-peripheral end face 82T of the outer peripheral edge portion 82 of the stopper 80 is molten entirely in the lid thickwise direction LT, but a vicinity of the inner step surface 43ID of the outer step portion 43 of the lid 40 fails to be molten deeply enough. This causes distortion in a shape of the formed solidified molten portion 90, and thus the outer step portion 43 of the lid and the outer peripheral edge portion 82 of the stopper 80 could be welded incompletely.

On the other hand, when the height H1 is not too large as compared to the thickness T1, an amount of molten metal formed of the molten outer peripheral edge portion 82 of the stopper 80 becomes less, which could cause shortage in a filling amount of the molten metal to be filled in the clearance SS between the outer step portion 43 of the lid 40 and the outer peripheral edge portion 82 of the stopper 80.

To address this, in the present embodiment, the height H1 is arranged to be as 1.25 times long as the thickness T1 within a range of 1.1 to 1.4 times. Thus, by melting the outer step portion 43 of the lid 40 positioned relatively close to the lid thickwise outside LTU, the molten metal (molten metal body) to become the solidified molten portion 90 is obtained, and the solidified molten portion 90 can be provided in a preferable shape between the outer step portion 43 of the lid 40 and the outer peripheral edge portion 82 of the stopper 80 to produce the battery 1 in which the outer step portion 43 and the outer peripheral edge portion 82 are welded.

Modified Embodiment 1

In the above-mentioned embodiment 1, the outer step portion 43 of the lid 40 includes on the lid thickwise outside LTU a flat surface formed of the outer annular step surface 43U and the extended outer annular step surface 43UE continuing from the outer annular step surface 43U on the hole radial inside HDI.

Alternatively, as indicated with broken lines in FIG. 3 and FIG. 4, there may be provided with an outer groove 45 recessed on the lid thickwise inside LTI on the hole radial outside HDU of the outer annular step surface 43U.

When this outer groove 45 is provided, the laser beam LB irradiated in the stopper welding step S3 is hard to escape to the hole radial outside HDU (in FIG. 3, on a left side over the outer groove 45). Accordingly, a part of the outer step portion 43 of the lid 40 on the hole radial inside HDI is easily molten, and the outer peripheral edge portion 82 of the stopper 80 can be further easily welded to the outer step portion 43 of the lid 40.

Embodiment 2

In the above-mentioned embodiment 1 and the modified embodiment 1, the outer step portion 43 of the to-be-sealed lid 40M is positioned relatively on the lid thickwise outside LTU to provide the difference in height in the lid thickwise direction LT between the outer step portion 43 of the to-be-sealed lid 40M and the outer peripheral edge portion 82 of the to-be-sealed stopper 80M.

On the other hand, in the present embodiment 2 (see FIG. 5 and FIG. 6), an outer peripheral edge portion 182 of the to-be-sealed stopper 180M is positioned relatively outside of the outer step portion 143 on the lid thickwise outside LTU to provide a difference in height between an outer step portion 143 of the to-be-sealed lid 140M and the outer peripheral edge portion 182 of the to-be-sealed stopper 180M in the lid thickwise direction LT.

Figure 5:
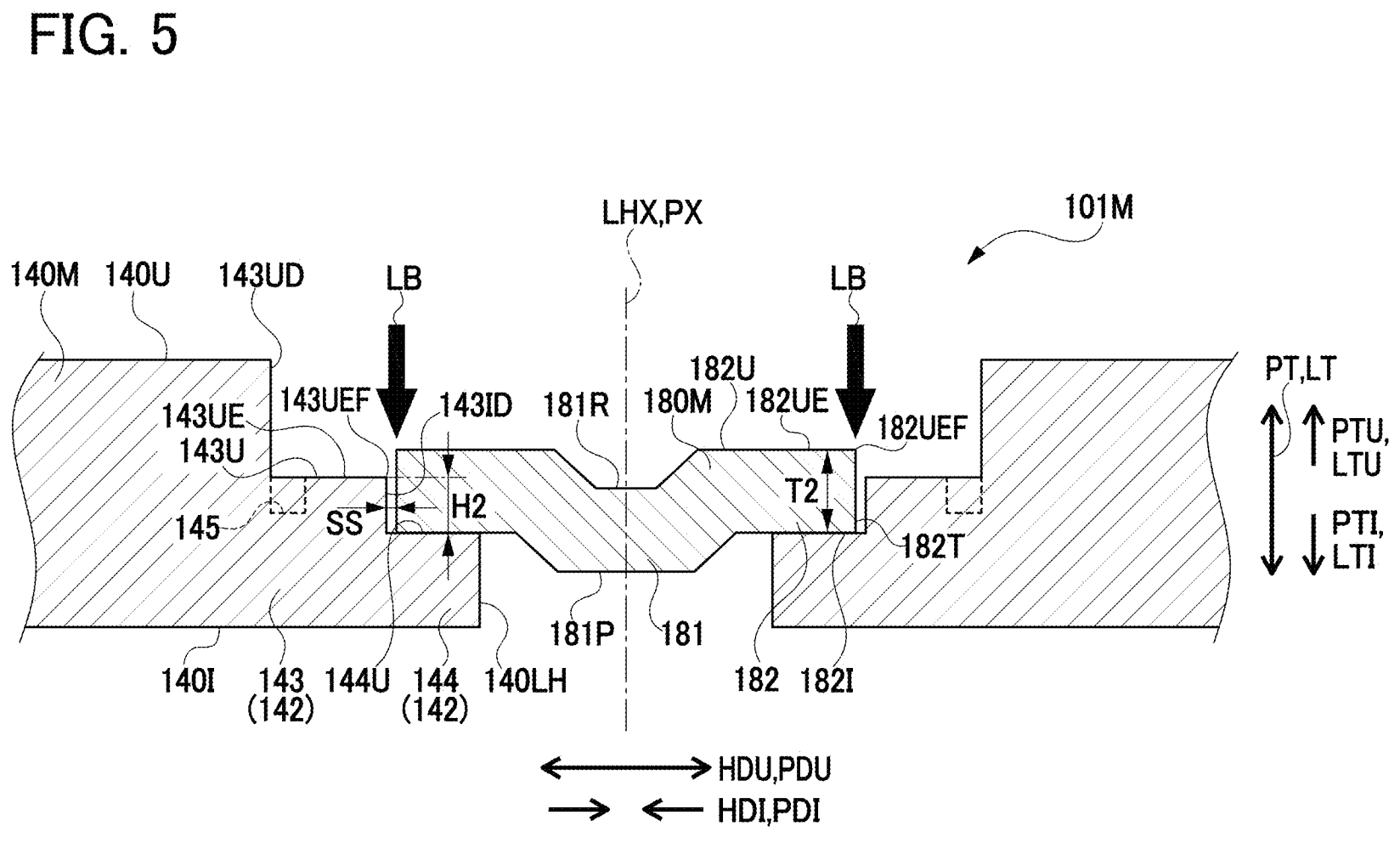

Specifically, the to-be-sealed lid 140M is also of a rect-angular flat shape including a lid outside plane 140U of a flat shape facing toward the lid thickwise outside LTU (an upper side in FIG. 5) and a lid inside plane 140I of a flat shape facing toward the lid thickwise inside LTI (a lower side in FIG. 5). A stopper circumferential portion 142 of the to-be-sealed lid 140M also includes a contact step portion 144 of an annular shape surrounding the stopper 149LH and an outer step portion 143 of an annular shape surrounding this contact step portion 144.

The contact step portion 144 is of an annular shape surrounding the liquid inlet 140LH of a circular shape, which penetrates the to-be-sealed lid 140M, and includes an annular flat lid contact surface 144U and being placed on the lid thickwise inside LTI than the lid outer plane 140U to face toward the lid thickwise outside LTU.

On the other hand, the outer step portion 143 includes a flat annular shaped outer annular step surface 143U annu-larly surrounding the contact step portion 144 and being placed on the lid thickwise inside LTI than the lid outer plane 140U and on the lid thickwise outside LTU and on the hole radial outside HDU than the lid contact surface 144U to face toward the lid thickwise outside LTU. The outer step portion 143 also includes an extended outer annular step surface 143UE extending to the hole radial inside HDI from the outer annular step surface 143U. In addition, the outer step portion 143 includes an inner step surface 143ID extending from the inner peripheral edge 143UEF of the extended outer annular step surface 143UE toward the lid thickwise inside LTI to reach the lid contact surface 144U with facing toward the hole radial inside HDI.

On the other hand, the to-be-sealed stopper 180M also includes a center portion 181 recessed toward the stopper thickwise inside PTI to be of a conical frustum shape and an outer peripheral edge portion 182 of a flat annular shape surrounding the center portion 181. This outer peripheral edge portion 182 includes a stopper contact surface 182I of a flat annular shape facing toward the lid thickwise inside LTI, a peripheral outward surface 182U of a flat annular shape facing toward the stopper thickwise outside PTU, and an extended peripheral outward surface 182UE extending toward the stopper radial outside PDU. Further, a cylindrical stopper outer-peripheral end face 182T extending from an outer peripheral edge 182UEF of the extended peripheral outward surface 182UE toward the stopper thickwise inside PTI to reach the stopper contact surface 182I with facing toward the stopper radial outside PDU is formed.

Then, in the stopper disposing step S2, the to-be-sealed stopper 180M is disposed on the liquid inlet circumferential portion 142 of the to-be-sealed lid 140M of the to-be-sealed battery 101M to cover the liquid inlet 140LH by this to-be-sealed stopper 180M. Thus, the stopper contact sur-face 182I of the outer peripheral edge portion 182 of the to-be-sealed stopper 180M opposes and comes to contact with the lid contact surface 144U of the contact step portion 144 of the to-be-sealed lid 140M to be contacted therewith, and the outer peripheral edge portion 182 of the to-be-sealed stopper 180M comes to contact with the contact step portion 144 of the to-be-sealed lid 140M.

As compared to the outer step portion 43 of the embodi-ment 1 and the like, however, in the present embodiment 2, a dimension of the outer step portion 143 in the lid thickwise direction LT is made small. Accordingly, as shown in FIG. 5, a thickness T2 from the stopper contact surface 182I to the extended peripheral outward surface 182UE of the to-be-sealed stopper 180M is made large as compared to a height H2 from the lid contact surface 144U of the to-be-sealed lid 140M to the extended outer annular step surface 143UE. As a result of this, there is created a difference in height in the lid thickwise direction LT between the outer step portion 143 of the to-be-sealed lid 140 and the outer peripheral edge portion 182 of the to-be-sealed stopper 180M.

In the following stopper welding step S3, the laser beam LB is irradiated to melt a part including the extended outer annular step surface 143UE and the inner step portion 143ID on the hole radial inside HDI of the outer step portion 143 of the to-be-sealed lid 140M. Along with this, a part includ-ing the extended peripheral outward surface 182UE and the stopper outer peripheral end face 182T on the stopper radial outside PDU of the outer peripheral edge portion 182 of the to-be-sealed stopper 180M is molten. Thus, the outer periph-eral edge portion 182 of the stopper 180 is laser welded to the outer step portion 143 of the lid 140 over the entire circumference (see FIG. 6). This laser welding also requires no filler material, and the formed solidified molten portion 90 is made only of metal (aluminum) constituting the lid 140 and the stopper 180.

In the present embodiment 2, too, there is created a difference in height in the lid thickwise direction LT between the outer step portion 143 of the to-be-sealed lid 140M and the outer peripheral edge portion 182 of the to-be-sealed stopper 180M to perform laser welding of the stopper welding step S3 for welding the outer step portion 143 and the outer peripheral edge portion 182 by melting. Accord-ingly, a portion located relatively outside of the outer step portion 143 on the lid thickwise outside LTU, namely a part on the stopper radial outside PDU of molten metal of the outer peripheral edge portion 182 of the to-be-sealed stopper 180M in the present embodiment 2, can be also used for filling a clearance SS between the outer step portion 143 of the to-be-sealed lid 140M and the outer peripheral edge portion 182 of the to-be-sealed stopper 180M for formation of the solidified molten portion 190. In this manner, the solidified molten portion 190 can be easily formed over the entire circumference the surface 190S which continues to the outer annular step surface 143U and the peripheral outward surface 182U and is positioned on the lid thickwise inside LTI as proceeding from the peripheral outward surface 182U (one example of the comparative outer surface) to the outer annular step surface 143U (one example of the comparative inner surface). Therefore, this battery 1 has no portion that has locally less molten metal constituting the solidified molten portion 190, which could result in local reduction in the dimension of the solidified molten portion 190 in the lid thickwise direction LT (in an upper and lower direction in FIG. 6), causing degradation in the sealing performance.

Further, the solidified molten portion 190 of the battery 101 (the lid 140 after sealing) is positioned on the lid thickwise inside LTI (on a lower side in FIG. 6) than the lid outer plane 140U of the lid 140 over the entire circumference. In the present embodiment 2, the solidified molten portion 190 is positioned on the lid thickwise inside LTI by about 0.2 mm than the lid outer plane 140U over the entire circumference. Therefore, in laser welding, the molten spatters flying at a low angle from the solidified molten portion 190 impinge on the outer step surface 143UD between the lid outer plane 140U and the outer step portion 143, so that these spatters are restrained from adhering by impinging on and deeply biting into the positive electrode insulator 60P and the negative electrode insulator 60N.

Accordingly, the battery 101 can achieve preferable insulation characteristics with restraining adhesion of the spatters to the positive electrode insulator 60P and the negative electrode insulator 60N and achieve preferable sealing characteristics by welding the stopper 180 to the liquid inlet circumferential portion 142 of the lid 140.

In addition, in the present embodiment 2, as mentioned above, the thickness T2 from the stopper contact surface 182I to the extended peripheral outward surface 182UE of the to-be-sealed stopper 180M (in the present embodiment 2, the thickness T2=0.5 mm) is made to be larger than the height H2 from the lid contact surface 144U to the extended outer annular step surface 143UE of the to-be-sealed lid 140M (in the present embodiment 2, the height H2=0.4 mm). This thickness T2 is better to be set as 1.1 to 1.4 times large as the height T2 (T2=1.1×H2 to 1.4× H2), and in the present embodiment, the thickness T2 is set as 1.25 times (T2=1.25×H2) large.

As mentioned above, in the stopper welding step S3, as shown in FIG. 6, the outer step portion 143 of the lid 140 and the outer peripheral edge portion 182 of the stopper 180 are molten such that the leading end 190A of the formed solidified molten portion 190 is positioned at the almost same level with the lid contact surface 144U in the lid thickwise direction LT.

When the thickness T2 from the stopper contact surface 182I to the extended peripheral outward surface 182UE of the stopper 180 is too large as compared to the height H2 from the lid contact surface 144U to the extended outer annular step surface 143UE of the lid 140, a gap in the molten state is easily generated in the outer step portion 143 of the lid 140 and the outer peripheral edge portion 182 of the stopper 180. Specifically, a part of the outer step portion 143 of the lid 140 on the hole radial inside HDI is molten deeply, but a vicinity of the stopper outer-peripheral end face 182T of the outer peripheral edge portion 182 of the stopper 180 on the stopper radial outside PDU fails to be molten deep enough. This causes distortion in a shape of the solidified molten portion 190, and thus the outer step portion 143 of the lid 140 and the outer peripheral edge portion 182 of the stopper 180 could be welded incompletely.

On the other hand, when the thickness T2 is not so large as compared to the height H2, an amount of the molten metal formed of the molten outer peripheral edge portion 182 of the stopper 180 becomes less, which could cause shortage in a filling amount of the molten metal to be filled in the clearance SS between the outer step portion 143 of the lid 140 and the outer peripheral edge portion 182 of the stopper 180.

To address this, in the present embodiment 2, the thickness T2 is arranged to be as 1.25 times long as the height H2 within a range of 1.1 to 1.4 times. Thus, by melting the outer peripheral edge portion 182 of the stopper 180 positioned relatively outside of the outer step portion 143 on the lid thickwise outside LTU, the molten metal (molten metal body) to be the solidified molten portion 190 is obtained and the solidified molten portion 190 can be provided in a preferable shape between the outer step portion 143 of the lid 140 and the outer peripheral edge portion 182 of the stopper 180 to produce the battery 101 in which the outer step portion 143 and the outer peripheral edge portion 182 are welded.

Modified Embodiment 2

In the above-mentioned embodiment 2, as similar to the embodiment 1, the outer step portion 143 of the lid 140 has a flat surface on the lid thickwise outside LTU formed of the outer annular step surface 143U and the extended outer annular step surface 143UE following therefrom to the hole radial inside HDI.

However, as indicated with a broken line in FIG. 5 and FIG. 6, there may be provided on the hole radial outside HDU of the outer annular step surface 143U with an outer groove 145 of an annular recessed shape recessed on the lid thickwise inside LTI.

When this outer groove 145 is provided, heat generated by irradiation of the laser beam LB in the stopper welding step S3 is hard to escape to the hole radial outside HDU (in FIG. 5, on a left side over the outer groove 145). Therefore, a part of the outer step portion 143 of the lid 140 on the hole radial inside HDI and a part of the outer peripheral edge portion 182 of the stopper 180 on the stopper radial outside PDU are easily molten, so that the outer peripheral edge portion 182 of the stopper 180 can be further easily welded to the outer step portion 143 of the lid 140.

As above, the present disclosure has been explained with the embodiments 1 and 2 and the modified embodiments 1 and 2, but the present disclosure is not limited to those embodiments and may be applied with any appropriate modifications without departing from the scope of the disclosure. For example, in the embodiments and others, the electrode body 10 is exemplified with a flat-wound electrode body formed by winding the strip-shaped positive electrode plate 11 and others. Alternatively, as the electrode body 10, a laminated electrode body, which is formed by alternately laminating a plurality of cut-sheet shaped positive electrode sheets of a rectangular shape or the like and a plurality of cut-sheet shaped negative electrode sheets of a rectangular shape or the like interposed with separators therebetween, may be used.

Further, in the embodiment 1, the lid 40 is explained with a configuration in which the hole radial inside HDI of the contact step portion 44 is constituted as the liquid inlet 40LH. Alternatively, as indicated with a broken line in FIG. 3 and FIG. 4, the lid 40 may be configured with a step portion 47 on the hole radial inside HDI of the contact step portion 44 protruding toward the hole radial inside HDI.

Further, in the embodiment 1, the lid 40 is configured such that the outer step portion 43 on the hole radial outside HDU continues to the lid outer plane 40U. Alternatively, as indicated with another broken line in FIG. 3 and FIG. 4, the lid 40 may further be formed with a groove 46 of an annular recessed shape recessed on the lid thickwise inside LTI than the lid outer plane 40U with a clearance from the outer step portion 43 on the hole radial outside HDU of the outer step portion 43.

REFERENCE SIGNS LIST

1, 101 Battery (Power storage device)
1M, 101M To-be-sealed battery
10 Electrode body
30 Case body member
30H Opening (of the case body)
40, 140 Lid member
40M, 140M To-be-sealed lid
LT Lid thickwise direction
LTI Lid thickwise inside
LTU Lid thickwise outside
40U, 140U Lid outer plane
40LH, 140LH Liquid inlet
LHX Hole axis (of the liquid inlet)
42, 142 Liquid inlet circumferential portion
HDI Hole radial inside
HDU Hole radial outside
43 Outer step portion (comparative outer surface)
143 Outer step portion (comparative inner surface)
43U, 143U Outer annular step surface
43UF Inner peripheral edge (of the outer annular step surface)
43UE, 143UE Extended outer annular step surface
43UEF, 143UEF Inner peripheral edge (of the extended outer annular step surface)
H2 Height (from the lid contact surface to the extended outer annular step surface)
H1 Height (from the lid contact surface to the extended outer annular step surface)
43ID, 143ID Inner step surface (of the outer step portion reaching the contact step portion)
43UD, 143UD Outer step surface (of the outer step portion reaching the lid outer plane)
44, 144 Contact step portion
44U, 144U Lid contact surface
45 Outer groove
60P Positive electrode insulator
60N Negative electrode insulator
LP Positive electrode shortest distance
LN Negative electrode shortest distance
80, 180 Stopper
80M, 180M To-be-sealed stopper
PX Stopper axis (of the stopper)
PTI Stopper thickwise inside
PTU Stopper thickwise outside
PDI Stopper radial inside
PDU Stopper radial outside
T1 Thickness (from the stopper contact surface to the extended peripheral outward surface)
82, 182 Outer peripheral edge portion
82I, 182I Stopper contact surface (of the outer peripheral edge portion)
82U Peripheral edge outward surface (of the outer peripheral edge portion, comparative inner surface)
182U Peripheral outward surface (of the outer peripheral edge portion, comparative outer surface)

82UE, 182UE Extended peripheral outward surface
82UEF, 182UEF Outer peripheral edge (of the extended peripheral outward surface)
82T, 182T Stopper outer-peripheral end face (of the outer peripheral edge portion)
T2 Thickness (form the stopper contact surface to the extended peripheral outward surface)
SS Clearance (of the outer peripheral edge portion of the stopper and the outer step portion of the lid before welding)
90, 190 Solidified molten portion
90S, 190S Surface (of the solidified molten portion)
90A, 190A Leading end (on the lid thickwise inside of the solidified molten portion)
S2 Stopper arranging step
LB Laser beam (energy beam)
S3 Stopper welding step

What is claimed is:
1. A power storage device comprising:
an electrode body;
a case body having an opening and housing the electrode body therein;
a lid of a flat-plate-like shape sealing the opening and having a liquid inlet penetrating therethrough in a lid thickwise direction;
a positive electrode terminal and a negative electrode terminal conducting with the electrode body and penetrating through the lid to extend outside;
a positive electrode insulator insulating the lid and the positive electrode terminal;
a negative electrode insulator insulating the lid and the negative electrode terminal; and
a stopper welded by energy beam to a liquid inlet circumferential portion surrounding the liquid inlet of the lid to seal the liquid inlet, wherein
the liquid inlet circumferential portion of the lid includes:
a contact step portion of an annular shape including a lid contact surface of an annular shape and surrounding the liquid inlet; and
an outer step portion of an annular shape including an outer annular step surface of an annular flat shape and surrounding the contact step portion,
the lid contact surface is configured to
be positioned on a lid thickwise inside than a lid outer plane of the lid and face toward a lid thickwise outside,
the outer annular step surface is configured to
be positioned on a hole radial outside than the lid contact surface, on the lid thickwise inside than the lid outer plane and on the lid thickwise outside than the lid contact surface, and face toward the lid thickwise outside,
the stopper is configured to:
be positioned on a hole radial inside than the outer step portion;
include
a stopper contact surface of an annular shape facing toward the lid thickwise inside to oppose and be contacted with the lid contact surface, and
a peripheral outward surface of a flat shape facing toward the lid thickwise outside,
include an outer peripheral edge portion of an annular shape contacted with the contact step portion,
a solidified molten portion of an annular shape made of metal, which is once molten and then solidified, is formed between the outer step portion of the lid and the outer peripheral edge portion of the stopper, the solidified molten portion is configured to be positioned its entire circumference on the lid thickwise inside than the lid outer plane of the lid, a surface of the solidified molten portion in its entire circumference is configured to:

continue to the outer annular step surface and the peripheral outward surface; and be positioned on the lid thickwise inside as proceeding from a comparative outer surface to a comparative inner surface when the outer annular step surface and the peripheral outward surface are defined as either one of a surface positioned on the lid thickwise outside as the comparative outer surface and a surface positioned on the lid thickwise inside as the comparative inner surface, and a height from the lid contact surface of the lid to the outer annular step surface is as 1.1 to 1.4 times long as a thickness from the stopper contact surface of the stopper to the peripheral outward surface.

2. The power storage device according to claim 1, wherein, a shorter one of:

a positive electrode shortest distance between the positive electrode insulator and the solidified molten portion; and a negative electrode shortest distance between the negative electrode insulator and the solidified molten portion is equal to or less than 30 mm.

3. A producing method of a power storage device comprising:

an electrode body;

a case body having an opening and housing the electrode body therein;

a lid of a flat-plate-like shape sealing the opening and having a liquid inlet penetrating in a lid thickwise direction;

a positive electrode terminal and a negative electrode terminal conducting with the electrode body and penetrating through the lid to extend outside;

a positive electrode insulator insulating the lid and the positive electrode terminal;

a negative electrode insulator insulating the lid and the negative electrode terminal; and a stopper welded by energy beam to a liquid inlet circumferential portion surrounding the liquid inlet of the lid to seal the liquid inlet, wherein the liquid inlet circumferential portion of the lid includes:

a contact step portion of an annular shape including a lid contact surface of an annular shape and surrounding the liquid inlet; and an outer step portion of an annular shape including an outer annular step surface of an annular flat shape and surrounding the contact step portion, the lid contact surface is configured to be positioned on a lid thickwise inside than a lid outer plane of the lid and face toward a lid thickwise outside, the outer annular step surface is configured to be positioned on a hole radial outside than the lid contact surface, on the lid thickwise inside than the lid outer plane and on the lid thickwise outside than the lid contact surface, and face toward the lid thickwise outside, the stopper is configured to:

be positioned on a hole radial inside than the outer step portion;

include:

a stopper contact surface of an annular shape facing toward the lid thickwise inside to oppose and be contacted with the lid contact surface; and a peripheral outward surface of a flat shape facing toward the lid thickwise outside, include an outer peripheral edge portion of an annular shape contacted with the contact step portion, a solidified molten portion of an annular shape made of metal, which is once molten and then solidified, is formed between the outer step portion of the lid and the outer peripheral edge portion of the stopper, the solidified molten portion is configured to be positioned its entire circumference on the lid thickwise inside than the lid outer plane of the lid, a surface of the solidified molten portion in its entire circumference is configured to:

continue to the outer annular step surface and the peripheral outward surface; and be positioned on the lid thickwise inside as proceeding from a comparative outer surface to a comparative inner surface when the outer annular step surface and the peripheral outward surface are defined as either one of a surface positioned on the lid thickwise outside as the comparative outer surface and a surface positioned on the lid thickwise inside as the comparative inner surface, wherein the outer step portion of the lid before welding includes:

an extended outer annular step surface extending from the outer annular step surface toward a hole radial inside; and an inner step surface extending from an inner peripheral edge of the extended outer annular step surface toward the lid thickwise inside to reach the lid contact surface with facing toward the hole radial inside, the outer peripheral edge portion of the stopper before welding includes:

an extended peripheral outward surface extending from the peripheral outward surface toward a stopper radial outside; and a stopper outer peripheral end face extending from an outer peripheral edge of the extended peripheral outward surface toward the stopper thickwise inside with facing toward the stopper radial outside, the method includes:

stopper disposing to dispose the liquid inlet on the hole radial inside than the outer step portion of the lid in a state in which the stopper contact surface of the stopper opposes and is contacted with the lid contact surface of the lid; and stopper welding to weld the outer step portion of the lid and the outer peripheral edge portion of the stopper over an entire circumference by energy beam, the stopper welding is to perform welding by melting:

a part of the outer step portion of the lid before welding on the hole radial inside including the extended outer annular step surface and the inner step surface; and a part of the outer peripheral edge portion of the stopper before welding on the stopper radial outside including the extended peripheral outward surface and the stopper outer-peripheral end face, and a height from the lid contact surface of the lid before welding to the extended outer annular step surface is as 1.1 to 1.4 times long as a thickness from the stopper contact surface of the stopper before welding to the extended peripheral outward surface.

4. A producing method of a power storage device comprising:

an electrode body;

a case body having an opening and housing the electrode body therein;

a lid of a flat-plate-like shape sealing the opening and having a liquid inlet penetrating in a lid thickwise direction;

a positive electrode terminal and a negative electrode terminal conducting with the electrode body and penetrating through the lid to extend outside;

a positive electrode insulator insulating the lid and the positive electrode terminal;

a negative electrode insulator insulating the lid and the negative electrode terminal; and a stopper welded by energy beam to a liquid inlet circumferential portion surrounding the liquid inlet of the lid to seal the liquid inlet, wherein the liquid inlet circumferential portion of the lid includes:

a contact step portion of an annular shape including a lid contact surface of an annular shape and surrounding the liquid inlet; and an outer step portion of an annular shape including an outer annular step surface of an annular flat shape and surrounding the contact step portion, the lid contact surface is configured to be positioned on a lid thickwise inside than a lid outer plane of the lid and face toward a lid thickwise outside, the outer annular step surface is configured to be positioned on a hole radial outside than the lid contact surface, on the lid thickwise inside than the lid outer plane and on the lid thickwise outside than the lid contact surface, and face toward the lid thickwise outside, the stopper is configured to:

be positioned on a hole radial inside than the outer step portion;

include:

a stopper contact surface of an annular shape facing toward the lid thickwise inside to oppose and be contacted with the lid contact surface; and a peripheral outward surface of a flat shape facing toward the lid thickwise outside, include an outer peripheral edge portion of an annular shape contacted with the contact step portion, a solidified molten portion of an annular shape made of metal, which is once molten and then solidified, is formed between the outer step portion of the lid and the outer peripheral edge portion of the stopper, the solidified molten portion is configured to be positioned its entire circumference on the lid thickwise inside than the lid outer plane of the lid, a surface of the solidified molten portion in its entire circumference is configured to:

continue to the outer annular step surface and the peripheral outward surface; and be positioned on the lid thickwise inside as proceeding from a comparative outer surface to a comparative inner surface when the outer annular step surface and the peripheral outward surface are defined as either one of a surface positioned on the lid thickwise outside as the comparative outer surface and a surface positioned on the lid thickwise inside as the comparative inner surface, wherein the outer step portion of the lid before welding includes:

an extended outer annular step surface extending from the outer annular step surface toward a hole radial inside; and an inner step surface extending from an inner peripheral edge of the extended outer annular step surface toward the lid thickwise inside to reach the lid contact surface with facing toward the hole radial inside, the outer peripheral edge portion of the stopper before welding includes:

an extended peripheral outward surface extending from the peripheral outward surface toward a stopper radial outside; and a stopper outer peripheral end face extending from an outer peripheral edge of the extended peripheral outward surface toward the stopper thickwise inside with facing toward the stopper radial outside, the method includes:

stopper disposing to dispose the liquid inlet on the hole radial inside than the outer step portion of the lid in a state in which the stopper contact surface of the stopper opposes and is contacted with the lid contact surface of the lid; and stopper welding to weld the outer step portion of the lid and the outer peripheral edge portion of the stopper over an entire circumference by energy beam, the stopper welding is to perform welding by melting:

a part of the outer step portion of the lid before welding on the hole radial inside including the extended outer annular step surface and the inner step surface; and a part of the outer peripheral edge portion of the stopper before welding on the stopper radial outside including the extended peripheral outward surface and the stopper outer-peripheral end face, and wherein a thickness from the stopper contact surface of the liquid inlet before welding to the extended peripheral outward surface is as 1.1 to 1.4 times long as a height from the lid contact surface of the lid before welding to the extended outer annular step surface.

5. A power storage device comprising:

an electrode body;

a case body having an opening and housing the electrode body therein;

a lid of a flat-plate-like shape sealing the opening and having a liquid inlet penetrating therethrough in a lid thickwise direction;

a positive electrode terminal and a negative electrode terminal conducting with the electrode body and penetrating through the lid to extend outside;

a positive electrode insulator insulating the lid and the positive electrode terminal;

a negative electrode insulator insulating the lid and the negative electrode terminal; and a stopper welded by energy beam to a liquid inlet circumferential portion surrounding the liquid inlet of the lid to seal the liquid inlet, wherein the liquid inlet circumferential portion of the lid includes:

a contact step portion of an annular shape including a lid contact surface of an annular shape and surrounding the liquid inlet; and an outer step portion of an annular shape including an outer annular step surface of an annular flat shape and surrounding the contact step portion, the lid contact surface is configured to
  be positioned on a lid thickwise inside than a lid outer plane of the lid and face toward a lid thickwise outside,
the outer annular step surface is configured to
  be positioned on a hole radial outside than the lid contact surface, on the lid thickwise inside than the lid outer plane and on the lid thickwise outside than the lid contact surface, and face toward the lid thickwise outside,
the stopper is configured to:
  be positioned on a hole radial inside than the outer step portion;
  include
    a stopper contact surface of an annular shape facing toward the lid thickwise inside to oppose and be contacted with the lid contact surface, and
    a peripheral outward surface of a flat shape facing toward the lid thickwise outside,
  include an outer peripheral edge portion of an annular shape contacted with the contact step portion,
a solidified molten portion of an annular shape made of metal, which is once molten and then solidified,
  is formed between the outer step portion of the lid and the outer peripheral edge portion of the stopper,
the solidified molten portion is configured to be positioned its entire circumference on the lid thickwise inside than the lid outer plane of the lid, a surface of the solidified molten portion in its entire circumference is configured to:
  continue to the outer annular step surface and the peripheral outward surface; and
  be positioned on the lid thickwise inside as proceeding from a comparative outer surface to a comparative inner surface when the outer annular step surface and the peripheral outward surface are defined as either one of a surface positioned on the lid thickwise outside as the comparative outer surface and a surface positioned on the lid thickwise inside as the comparative inner surface,
wherein a thickness from the stopper contact surface of the liquid inlet to the peripheral outward surface is as 1.1 to 1.4 times long as a height from the lid contact surface of the lid to the outer annular step surface.

6. The power storage device according to claim 5, wherein, a shorter one of:
  a positive electrode shortest distance between the positive electrode insulator and the solidified molten portion; and
  a negative electrode shortest distance between the negative electrode insulator and the solidified molten portion is equal to or less than 30 mm.

* * * * *